United States Patent
Martinez-Barbreau

(10) Patent No.: US 11,800,873 B2
(45) Date of Patent: Oct. 31, 2023

(54) USE OF A CRUSHED PLANT MATERIAL FOR PROMOTING PLANT OR ROOT GROWTH AND METHOD FOR SPEEDING UP THE GROWTH OF A PLANT

(71) Applicant: Christelle Martinez-Barbreau, Cazevieille (FR)

(72) Inventor: Christelle Martinez-Barbreau, Cazevieille (FR)

(73) Assignee: Elicir SAS, Montpellier (FR)

( * ) Notice: Subject to any disclaimer, the term of this patent is extended or adjusted under 35 U.S.C. 154(b) by 277 days.

(21) Appl. No.: 15/505,605

(22) PCT Filed: Aug. 25, 2014

(86) PCT No.: PCT/FR2014/052123
§ 371 (c)(1),
(2) Date: Feb. 21, 2017

(87) PCT Pub. No.: WO2016/030584
PCT Pub. Date: Mar. 3, 2016

(65) Prior Publication Data
US 2017/0273312 A1 Sep. 28, 2017

(51) Int. Cl.
*A01N 65/00* (2009.01)
*C08B 37/00* (2006.01)
*C05F 11/00* (2006.01)
*C05F 11/10* (2006.01)
*A01G 7/06* (2006.01)

(52) U.S. Cl.
CPC .............. *A01N 65/00* (2013.01); *C05F 11/00* (2013.01); *C05F 11/10* (2013.01); *C08B 37/0003* (2013.01); *A01G 7/06* (2013.01)

(58) Field of Classification Search
CPC ........... A01G 7/06; A01N 65/00; C05F 11/00; C05F 11/10
USPC ....................................................... 504/118
See application file for complete search history.

(56) References Cited

U.S. PATENT DOCUMENTS

| | | | | |
|---|---|---|---|---|
| 2006/0111238 A1* | 5/2006 | Lazzeri | ................ | A01N 65/00 504/117 |
| 2008/0199451 A1* | 8/2008 | Rongai | ................ | A01N 65/00 424/94.61 |
| 2015/0037389 A1* | 2/2015 | Ragot | ................... | A61K 36/74 424/439 |

FOREIGN PATENT DOCUMENTS

FR    3003131 A1 *  9/2014    ............. A01N 65/08

OTHER PUBLICATIONS

Optimum Climate and Olive Varietiesclimatic Factors [online], [retrieved on Jan. 2, 2019], Retrieved from the Internet: <URLhttps://www.mcevoyranch.com/about/farming-practices/optimum-climate-and-olive-varieties>.*
Mahr, Argula, Eruca Sativa [online], [retrieved on Apr. 28, 2019], Retrieved from the Internet.*
Sacan et al. (Asian Journal of Chemistry, vol. 20, No. 5 (2008), pp. 3462-3474).*
Iram et al. (Pakistan J. Agric. Res. vol. 27 No. 3, Jul. 1, 2014, pp. 250-254).*
Areej Ali Baeshen (Int.J. Curr.Res.Aca. Rev. 2014; 2(4): 135-145).*
Hatamleh et al. (International Journal of Pharmacology 10(6): 322-327, 2014).*
Aissani et al. (J. Agric. Food Chem. 2015, 63, 27, 6120-6125).*
Tiyagi et al. (Bioresource Technology, 1995, vol. 51, Issues 2-3, 1995, pp. 233-239).*
Messiha et al., The Physiological Influence of Allelochemicals in Two *Brassicaceae* Plant Seeds on the Growth and Propagative Capacity of Cyperus rotundus and Zea mays L., World Applied Sciences Journal 26 (9): 1142-1149, 2013.*
Germination and Seedling Growth of Corn Under Varying Levels of Copper and Zinc; Seema Mahmood; Aug. 29, 2005.

* cited by examiner

Primary Examiner — Ali Soroush
Assistant Examiner — Courtney A Brown
(74) Attorney, Agent, or Firm — Patshegen IP; Moshe Pinchas

(57) ABSTRACT

The invention relates to the use of a crushed material obtained from at least one part of rocket plants, for example of the genera *Eruca* (*Eruca Eruca vesicaria*, etc.), *Diplotaxis* (*Diplotaxis erucoides*, *Diplotaxis tenuifolia*, *Diplotaxis muralis*, etc.), *Bunias* (*Bunias erucago*, *Bunias orientalis*, etc.), *Erucastrum* (*Erucastrum nasturtiifolium*, *Erucastrum incanum*, etc.) or Cakile, in order to promote plant growth or root growth.

23 Claims, 12 Drawing Sheets

|  | DM4J | DM11J | DM34J |
|---|---|---|---|
| Mean size of the aboveground portion (cm) | C=31.42 b<br>A=37.14 a | C=57.14 b<br>A=64.28 a | C=110 b<br>A=119.14 a |
| Mean rate of growth (cm/d$^{-1}$) | C=1.32 b<br>A=2.32 a | C=2.64 b<br>A=3.08 a | C=2.4 b<br>A=2.6 a |
| Mean diameter of the stem (cm) | -<br>- | C=5.41 b<br>T=6 a | C=5.5 b<br>T=6.25 a |
| Aboveground portion weight (g) | -<br>- | -<br>- | C= 30 b<br>A= 35.5 a |

Figure 21

|  | DM4J | DM8J | DM15J |
|---|---|---|---|
| Chlorophyll index<br><br>Dualex unit | C=26.87<br><br>b | C=30.62<br><br>b | C=34.37<br><br>b |
|  | C=28.12<br><br>a,b | C=33.12<br><br>a,b | C=37.87<br><br>a |
|  | P=29.37<br><br>a | P=33.75<br><br>a | P=35<br><br>b |
| Flavonol index<br><br>Dualex unit | C=0.64<br><br>b | C=0.77<br><br>b | C=0.71<br><br>b |
|  | A=0.83<br><br>a,b | A=0.81<br><br>a,b | A=0.78<br><br>a,b |
|  | P=0.93<br><br>a | P=0.91<br><br>a | P=0.88<br><br>a |

Figure 22

USE OF A CRUSHED PLANT MATERIAL FOR PROMOTING PLANT OR ROOT GROWTH AND METHOD FOR SPEEDING UP THE GROWTH OF A PLANT

CROSS-REFERENCES TO RELATED APPLICATIONS

This application is a national phase application of PCT Application Serial No. PCT/FR2014/052123 entitled: USE OF A CRUSHED PLANT MATERIAL FOR PROMOTING PLANT OR ROOT GROWTH AND METHOD FOR SPEEDING UP THE GROWTH OF A PLANT, filed on Aug. 25, 2014, the disclosure of which is incorporated by reference in its entirety herein.

TECHNICAL FIELD OF THE INVENTION

The present invention concerns a biostimulant, a use of crushed material obtained from Rocket plant, for example of the genera *Eruca* (*Eruca sativa, Eruca vesicaria*, etc), *Diplotaxis* (*Diplotaxis erucoides, Diplotaxis tenuifolia, Diplotaxis muralis*, etc), *Bunias* (*Bunias erucago, Bunias orientalis*, etc), *Erucastrum* (*Erucastrum nasturtiifolium, Erucastrum incanum*, etc) or *Cakile* (*Cakile maritima*, etc), in order to promote plant growth or root growth, and a method for speeding up the growth of a plant.

The present invention applies, in particular, to promoting plant growth (increasing the biomass of plants in general, and/or increasing the size of plants, and/or increasing the size of the fruit, and/or increasing the weight of the fruit), as well as the precocity of plant growth (earlier flowering, and/or appearance of fruit, and/or physiological stages in general). The present invention applies to agriculture in general, gardening, horticulture, arboriculture, etc.

The usefulness of the product of the invention has also been proven in conditions of stress for the plant (for example water stress).

STATE OF THE ART

Since the end of the Second World War, the global pesticide industry has been one of the main factors in the rising productivity of agriculture throughout the world.

Since the early 1990s, the intensive use of chemical products in agriculture has been increasingly called into question by both the public and scientific communities. Serious concerns have therefore arisen about the long-term effects of the products used on the environment: effects on animal species other than those targeted, on aquatic systems, as well as about the amount of residue in the treated products (fruit, vegetables) to which consumers will be exposed.

There is also the problem of the direct exposure of users (farmers), who will be in direct contact for years with the agricultural products, whose long-term toxic effects are not always known.

Therefore, there is a growing consumer demand in developed markets for food known as "organic".

Parallel to this growing awareness and this change in some agricultural practices, ministries in various European countries, and even worldwide, are undertaking serious steps to "reduce chemical inputs", with a vast campaign to inform and raise awareness about the need to stop inappropriate use of chemicals.

At the same time, some chemical products are being "removed from the market" by European authorities, because of their recognized toxicity. It should be noted that the molecules removed are not always replaced by another one, leaving some phytosanitary problems with no solution.

A very serious problem concerns the entire family of fertilizing products, fertilizers, also used abusively to achieve ever-higher levels of production. The use of fertilizers therefore brings two types of consequences that can entail health risks (affecting human health) or environmental risks (damage to ecosystems). The best-known health risk relates to the consumption of water high in nitrate (nitrogen fertilization) by infants.

The environmental risk cited most is pollution of the drinking water, or eutrophication of water, when too much organic or mineral fertilizer is applied compared to the plants' needs and the soil's retention capacity, and the soluble elements enter the groundwater through infiltration or watercourses through run-off.

More generally, the consequences of intensive use of fertilizers, which can entail risks and which are being critically examined, are as follows: effects on the quality of soils, their fertility, their structure, the humus and the biological activity; effects on erosion; effects linked to the nitrogen cycle and the toxicity of the nitrates; effects linked to the phosphorous cycle; effects linked to the presence of heavy metals (cadmium, arsenic, fluorine); eutrophication of fresh water and seawater; pollution emitted by the fertilizer industry; etc.

Biostimulants are among a range of new emerging products whose benefit is to boost sustainable, safe agriculture. This new family of products should allow the use of conventional fertilizers and inputs, and therefore the environmental impact of agricultural treatments, to be reduced.

In order to replace the intensive use of polluting fertilizers, a Biostimulant applied on the plant or in the rhizosphere must have a positive effect on a plant's growth, enabling better assimilation of nutrients (for example, by acting on the development of the root system) thereby boosting the effectiveness of the nutrition, better resistance to abiotic stresses, or improved quality of the crop, independent of a fertilizing function. The plant's metabolism must be stimulated so that it can optimize the use of the available resources, rather than providing it with an intensive application of fertilizers.

Several categories of Biostimulants are known among the existing products on the market: the use of microbial inoculants (MIs) is one practice that has attracted growing interest in recent years (Hayat, et al. 2010). These products contain living microorganisms which, when applied onto seeds, plants or in the soil during germination, play a role in the plants' growth. The MIs can contain bacterial, fungal or arbuscular mycorrhizal fungi (AMF) (Vessey, 2003; Adesemoye & Kloepper, 2009; Berg, 2009) types of living microorganisms, which can be isolated from the soil, plant residue (or live plants), water, composted manure, etc. Among the biostimulants that have been studied extensively are the soil bacteria (Plant growth-promoting bacteria, PGPB) and the rhizobacteria (Plant growth-promoting rhizobacteria, PGPR) promoting the growth of plants. All these forms of bacteria have been isolated from the rhizosphere (Bashan et al., 2014).

Humic substances (HSs) are also known. The HSs can play several roles in the soil, such as improving the availability of nutrients. As well as these functions, the HSs can induce changes in the plant's physiology and in the microorganism composition of the rhizosphere (Varanini & Pinton, 2000). The activity of these substances is highly dependent on their structural characteristics (Berbara & García, 2014).

Stimulation of growth and tolerance to different biotic and abiotic stresses have been recorded in plants after they have been treated with products based on protein hydrolyzates and free amino acids. This stimulating and protective effect does not seem to be the result of improved nitrogenous nutrition (Ertani et al., 2009). Protein-based biostimulants can be classified into two main categories: (i) protein hydrolysates (PHs), composed of plant- or animal-based peptides or amino acids; and (ii) free amino acids (FAAs), such as glutamate, glutamine, proline and glycine.

Marine algae have also been long used to improve soil fertility and increase the productivity of field crops (Craigie, 2011). After the development of technical methods of liquid extraction in the 1950s (Milton, 1952), a large variety of algae extract (AE) products was marketed worldwide and used as input in agriculture (Craigie, 2011). Initially, these extracts were described as chelators improving the use of mineral elements and soil aeration (Milton, 1964). Algae extracts are now known for their biostimulant roles in activating several processes, such as germination, vegetative growth, flowering, and response to biotic and abiotic stresses, which improves yields and the harvesting process (Norrie & Keathley, 2005; Mancuso et al. 2006; Hong et al. 2007; Rayorath et al. 2008; Craigie, 2011; Mattner, et al., 2013). In the market, a large proportion of AEs are produced from brown (marine) algae such as *Ascophyllum nodosum*, *Fucus*, *Laminaria*, *Sargassum* and *Turbinaria* spp (Hong et al. 2007; Sharma et al. 2012). Often used in low doses (diluted to 1:1000 or more) in agriculture, several scientists rule out a fertilizing effect (Khan et al. 2009).

Algae extracts can contain a large range of organic molecules of minerals and include polysaccharide complexes absent in land plants, such as laminarin, fucoidan, alginates and hormones (Rioux et al. 2007; Khan et al. 2009).

On the other hand, very few plant extracts are known to act as Biostimulant or stimulator of the growth of plants, or of their root system.

SUBJECT OF THE INVENTION

The present invention aims to find an effective solution for stimulating the growth of plants and their root development, thanks to a plant extract based on plants from the genus Rocket, which presents no hazardous toxicological profile, and respects the environment and all life forms.

To this end, according to a first aspect, the present invention envisages a biostimulant that is the subject of claim 1, a use of crushed material that is the subject of claim 14, and a method for speeding up the growth of a plant that is the subject of claim 15.

It is noted here that rocket ("*Eruca sativa*") is an annual plant of the *Brassicaceae* (or *Cruciferae*) family, with white or yellowish flowers veined with brown or purple, whose generally elongated, pinnately incised leaves have a pungent peppery flavor. Depending on the region, it is also known as rucola, arugula, rouquette or riquette. Riquette is a wild form of rocket with very tasty small leaves. Other related plants, from the genus *Diplotaxis*, are called rocket. When they need to be differentiated, *Diplotaxis* rockets are called "wild rocket" and *Eruca* rockets "garden rocket". The present invention is not restricted to these rocket species, and extends beyond *Eruca sativa*. Rocket's description can also vary depending on its origin and regions. It is noted that common names for rocket plants also include Rucola and Arugula.

Preferably, the Rocket utilized by the present invention is of the genera *Eruca* (*Eruca sativa*, *Eruca vesicaria*, etc), *Diplotaxis* (*Diplotaxis erucoides*, *Diplotaxis tenuifolia*, *Diplotaxis muralis*, etc), *Bunias* (*Bunias erucago*, *Bunias orientalis*, etc), *Erucastrum* (*Erucastrum nasturtiifolium*, *Erucastrum incanum*, etc) or *Cakile* (*Cakile maritima*, etc). For the purposes of the present invention, Rocket comprises all these plants, possibly mixed. The Rocket plants mentioned belong to the Capparales order and to the Brassicaceae family.

It is also noted that the active ingredient, or active substance, of a product for promoting a plant's development is all that product's ingredients that have a favorable effect on a plant's development.

Plant development comprises plant growth, including root growth, and the precocity of the plant in question.

Plant growth, for a plant, is all the plant's irreversible quantitative changes that occur over time. Growth is a datum that can be expressed as unit of length per unit of time, or as unit of mass per unit of time. Growth comprises, in particular, the lengthening of the internodes and roots, the multiplication of cells and/or their extension, and the growth of leaves.

Precocity refers to a living organism reaching its mature state more quickly than the average for the species under the same conditions (seasons, environmental parameters, etc). In plants, the precocity induced by the use of crushed material that is the subject of the present invention, can be measured/quantified by noting the appearance of different physiological stages (first leaves, first flowers, first fruit, etc) for the plants treated, compared to the physiological stages for plants of the same species that have not been treated by the use of crushed material that is the subject of the present invention.

The stimulation of root growth is characterized by a change in the root system (shortening or lengthening of the primary root, shortening or lengthening of the secondary roots, appearance of root hairs, etc). This stimulation by the use of crushed material that is the subject of the present invention can be measured by comparing the root system of treated and untreated plants.

Such a composition can consist of a total crude extract obtained by extraction from the plant of the genus Rocket, of a fraction enriched in the active compound(s) of such a total extract, or of one or a plurality of active compound(s) in a mixture. Such a composition advantageously makes it possible, when present in an effective amount, to speed up plant growth, in particular for lettuces, vegetables and other plants intended for human or animal consumption, and for ornamental plants, trees and shrubs.

In some embodiments, at least one active ingredient is obtained from leaves of plants from the genus rocket.

The inventor has discovered that the leaves of plants from the genus rocket contain particularly effective active ingredients for promoting plant growth.

In some embodiments, at least one active ingredient is obtained from seeds of plants from the genus rocket.

In some embodiments, at least one active ingredient is obtained from flowers of plants from the genus rocket.

In some embodiments, at least one active ingredient is obtained by grinding at least one part of plants from the genus rocket.

In some embodiments, at least one active ingredient is obtained by aqueous extraction, oil extraction, solvent extraction, or by extraction of press cakes or pastes. It is recalled here that press cakes are the solid residue obtained after extracting oil from oleaginous seeds or fruit.

In some embodiments, the composition that is the subject of the present invention is formulated in the form of powder, granules, dispersible granules or slow-diffusion granules.

In some embodiments, the composition that is the subject of the present invention is formulated in liquid form.

According to a second aspect, the present invention envisages a use of a composition that is the subject of the present invention for promoting plant growth or stimulating root growth.

According to a third aspect, the present invention envisages a method for speeding up the growth of a plant, comprising the application on said plant of a composition that is the subject of the present invention.

In some embodiments, the application on the plant is achieved by foliar spray, watering the soil, drop-by-drop irrigation, use in hydroponics, seed treatment and/or seed coating.

According to a fourth aspect, the present invention envisages a method for producing a composition, comprising a step of grinding at least one part of plants from the genus rocket to provide crushed material, and filtering solid portions of said crushed material to obtain a liquid.

As the particular features, advantages and aims of this use and of these methods are similar to those of the composition that is the subject of the present invention, they are not repeated here.

BRIEF DESCRIPTION OF THE FIGURES

Other advantages, aims and characteristics of the present invention will become apparent from the description that will follow, made as an example that is in no way limiting, with reference to the drawings included in an appendix, in which:

FIGS. 21 and 22 represent, in the form of tables, measurements of various ecophysiological parameters during the use and the method that are the subjects of the present invention.

DESCRIPTION OF EXAMPLES OF REALIZATION OF THE INVENTION

In general, the present invention concerns the use of crushed material obtained from at least one part of "rocket" plants for:
- stimulating the root growth of plants;
- stimulating plant growth;
- precocity of plant growth;
- increasing the production of flowers and/or seeds and/or fruit; and/or
- the resistance of plants subjected to water stress.

The crushed material, which serves to supply the biostimulant that is the subject of the present invention, can be used by foliar spray or watering the soil.

Figure 1:
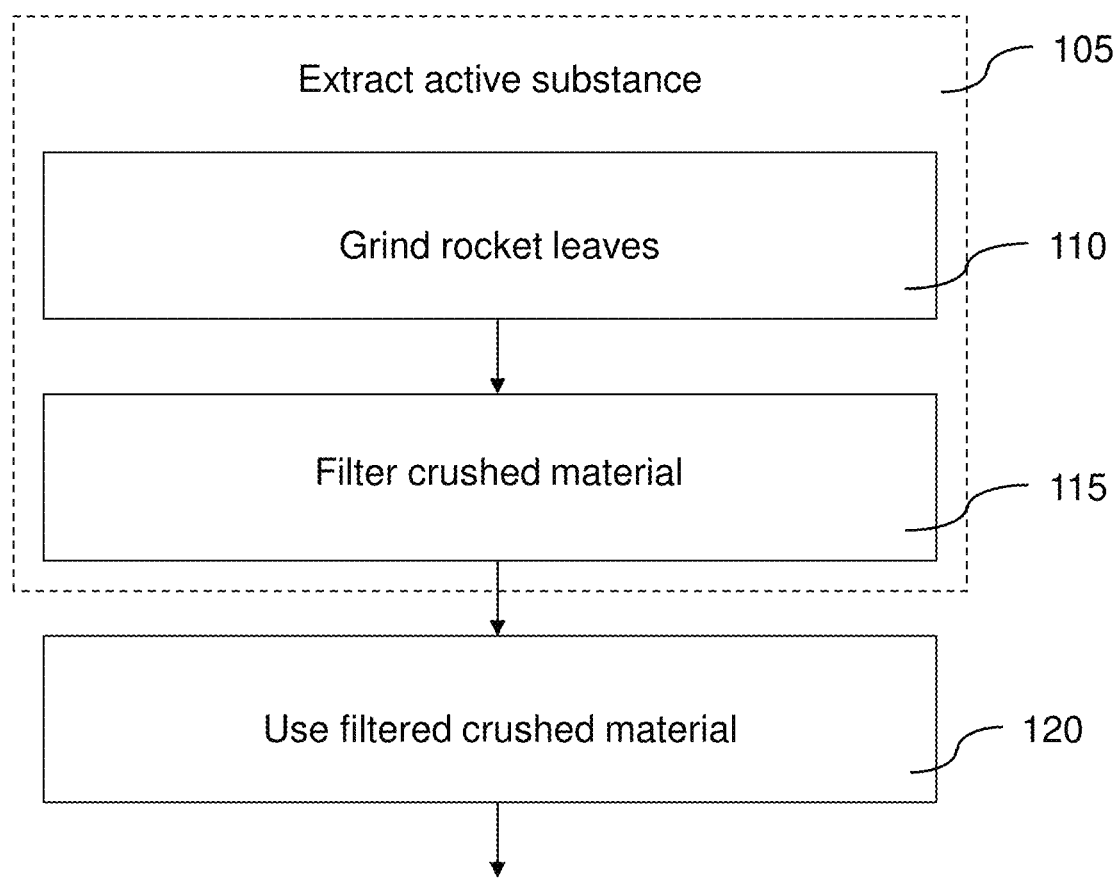
FIG. 1 represents, in the form of a logical diagram, steps in a particular embodiment of the method for producing and using crushed material that is the subject of the present invention.

As shown in FIG. 1, in an embodiment, the method for producing and using the crushed material that is the subject of the present invention comprises a step 105 of extracting a rocket extract. For example, this extraction is carried out according to the following procedure:

during a grinding step 110, the rocket leaves are ground finely in tap water, for fifteen minutes, in a suitable mixer device to obtain a homogenous crushed material;

during a filtering step 115, the crushed material is filtered to separate the leaf matter and obtain a green-colored liquid without leaf residue, which constitutes a crushed material used as a biostimulant.

In a variant, at least one active ingredient of the crushed material is obtained by aqueous extraction, solvent extraction, or oil extraction.

In a variant, at least one active ingredient of the crushed material is obtained by extraction of press cakes or pastes of rocket.

For the use of this crushed material, during a step 120, this liquid crushed material is sprayed at foliar level on the plants to be treated, or used in watering the soil.

The inventor has discovered that the use of crushed material has a significant effect on the growth of plants.

It is noted that the liquid crushed material obtained at the end of step 115 can be formulated to make it easier to use. For example, it is used in the form of powder, granules, dispersible granules or slow-diffusion granules, depending on the formulation chosen and the envisaged uses. The formulations are realized using the crushed material from the extraction step 105.

Active fractions may potentially be purified, by any means whatsoever, to facilitate the formulation. Different extraction steps can be added to improve its quality.

The crushed material can be diluted in water depending on the required dose, at the time of its use.

With respect to the use and formulation of the crushed material, the finished product, or biostimulant which is formed from this crushed material, can be applied in any form whatsoever (liquid, powder, soluble powder, granules, dispersible granules, slow-diffusion granules, etc formulation) depending on the uses and the formulation chosen. The crushed material that is the subject of the present invention can be used by foliar spray, watering the soil, drop-by-drop irrigation, use in hydroponics, seed treatment, seed coating, etc.

The crushed material can be used at a rate of between one day and one hundred and twenty days, or continuously, or according to the key growth stages of the plant, in accordance with best agricultural practices and the treatment schedules for each plant species. The crushed material can be mixed with other products (phytosanitary products, growing mediums and fertilizing material, fertilizers, or any other product intended for agriculture). The application doses and the rates of application are adapted to the uses and the plant types. The application doses are, for example, between 0.01 g/L and 12 g/L.

The crushed material can be used as root growth stimulator and for stimulating plant growth. The crushed material, used for watering the soil, or as a foliar spray, seed treatment or seed coating, makes it possible to increase root growth (growth of secondary roots, production of root hairs, etc) and stimulates the growth of the plant (increased number and size of fruit, earliness of the harvest, increased foliar growth, etc).

Elements showing the effectiveness of the composition that is the subject of the present invention are given below.

Statistical processing of the data: An analysis of variance was performed on the results of each reading. For each reading, the analyses were performed without including the control. When the assumptions of the analysis of variance were met, a mean comparison was performed using the Newman-Keuls test with the 5% threshold. The ranking produced by this test is presented with the results in the form of letters (a, b, c). The means followed by the same letter are not significantly different.

1/Tomatoes

The finished product produced from the rocket (*Eruca sativa*) crushed material, applied at a rate of ten days, allowed the number of tomatoes per plant and the total harvest weight to be increased significantly. Using the crushed material that is the subject of the present invention (here labeled "FERTI01") was more effective than using the chosen baseline product, Osiryl (registered trademark) root growth stimulator, approved in France under marketing authorization number 1030003, referred to, below, as the baseline.

For tomatoes, the application methods comprised watering the soil utilizing a liquid formulation. Table 1 shows the effectiveness of using crushed material that is the subject of the present invention on tomatoes, for a control plant, a plant treated with the baseline product.

product 225; and the total weight of tomatoes harvested in the method of plants treated with the finished product from the crushed material 230.

In the trial conditions, the effectiveness of using crushed material that is the subject of the present invention on tomatoes has therefore been demonstrated, in comparison to the baseline product approved in France, which is a root growth stimulator.

For this trial, seven applications were carried out, at ten-day intervals. The observations were recorded for the tomatoes harvested over a 28-day harvest period.

Figure 2:
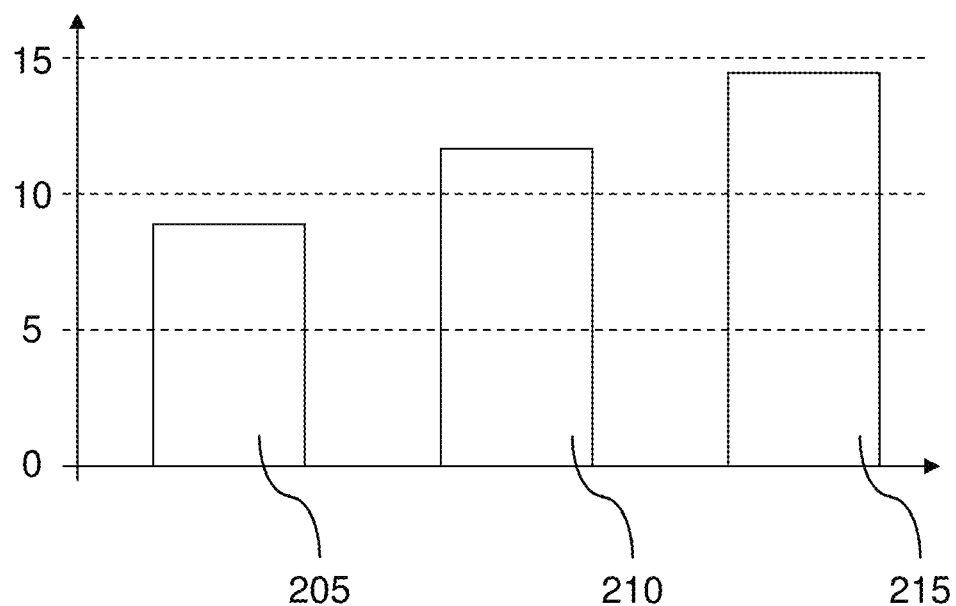
FIGS. 2 to 10 show, in the form of graphs, comparisons of results obtained with the use of the crushed material that is the subject of the present invention.

The results show that the mean number of tomatoes per plant for the plots treated using crushed material that is the subject of the present invention (14.50 tomatoes/plant) was higher than the mean number of tomatoes per plant in the plots not treated, or treated with the baseline product (9 and 11.25 tomatoes/plant, respectively) (table 1 and FIG. 2).

Figure 3:
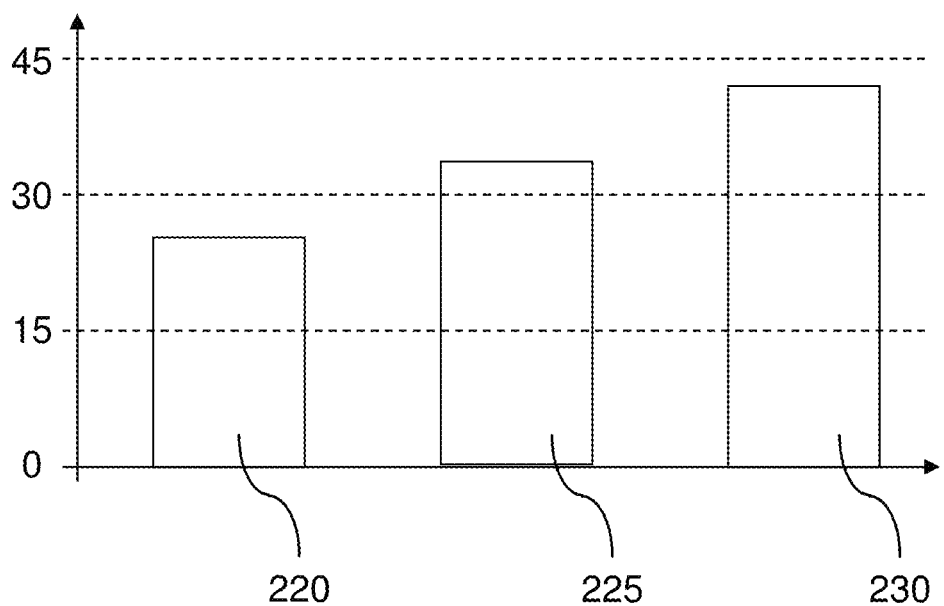

The observations also show that the total harvest weight of the plots treated using crushed material that is the subject of the present invention (43.80 kg) was higher than the total harvest weight in the plots not treated, or treated with the baseline product (25.65 and 31.75 kg, respectively) (table 1 and FIG. 3).

Seven applications, at ten-day intervals, of the finished product from the crushed material allowed the number of tomatoes per plant and the total harvest weight of the treated tomato plants to be increased significantly.

Lastly, it is noted that the results of this trial were obtained over a short harvest period (28 days).

2/Lettuces

The finished product from the rocket (*Eruca sativa*) crushed material (here labeled "FERTI01"), applied at a rate

TABLE 1

| | Effectiveness on tomatoes (20 plants/method) | | | | |
|---|---|---|---|---|---|
| Crop | Reading | Dates | Control | Baseline | FERTI 01 |
| Tomato *Lycopersicon esculentums* MILL. | Mean number of tomatoes per plant over the harvest period | Harvests Jul. 2, 2011 to Jul. 30, 2011 | 9 a | 11.25 ab | 14.50 b |
| | Total harvest weight (kg) per method | | 25.65 a | 31.75 ab | 43.80 b |

FIG. 2 shows the mean number of tomatoes per plant and per method, from table 1. It shows the mean number of tomatoes per control plant 205; the mean number of tomatoes per plant treated with the baseline product 210; and the mean number of tomatoes per plant treated with the finished product from the crushed material 215.

FIG. 3 shows the total weight (in Kg) of tomatoes harvested per method over the harvest period, from table 1. It shows the total weight of tomatoes harvested in the method of control plants 220; the total weight of tomatoes harvested in the method of plants treated with the baseline of ten days, allowed the diameter of the lettuces and the weight of the treated lettuces to be increased significantly. Using crushed material that is the subject of the present invention was statistically more effective than using the baseline product Osiryl mentioned above.

For lettuces, the methods of applying the finished product from the crushed material comprised watering the soil utilizing a liquid formulation. Table 2 shows the effectiveness of using crushed material that is the subject of the present invention on lettuces, for a control plant, a plant treated with the baseline product, and the lettuce treated using crushed material that is the subject of the present invention.

TABLE 2

Effectiveness on lettuces (10 plants/method)

| Crop | Reading | Dates | Control | Baseline | FERTI 01 |
|---|---|---|---|---|---|
| Lettuce *Lactuca sativa* | Mean diameter of the lettuces (cm) | At harvest: Mar. 12, 2011 | 20.1 a | 21.2 a | 25.33 b |
| | Mean weight of the lettuces (g) | | 280.5 a | 283.1 a | 295.3 b |

Figure 4:
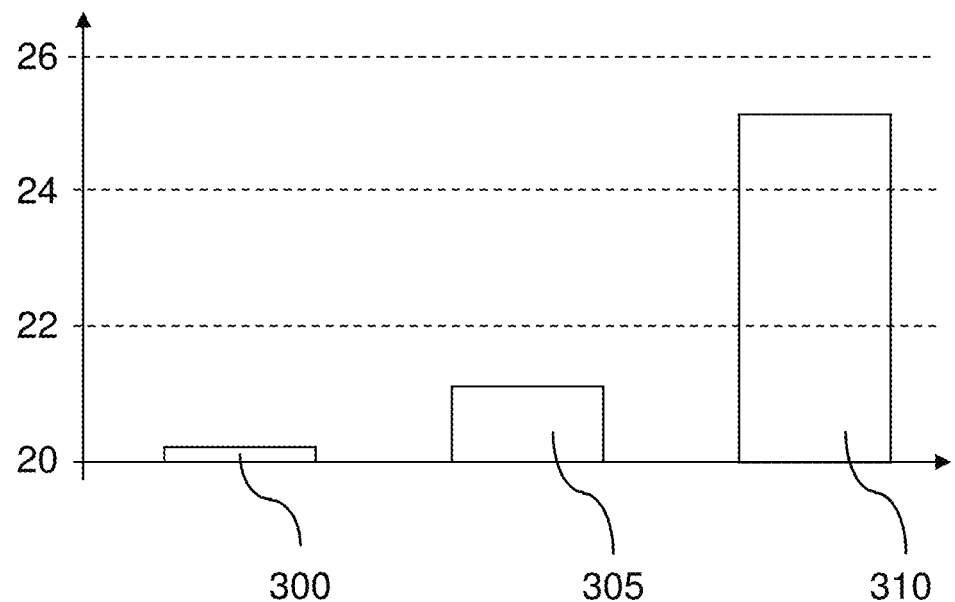

FIG. 4 shows the mean diameter of the lettuces per method, from table 2. It shows the mean diameter of the control lettuces 300; the mean diameter of the lettuces treated with the baseline product 305; and the mean diameter of the lettuces treated using crushed material that is the subject of the present invention 310.

Figure 5:
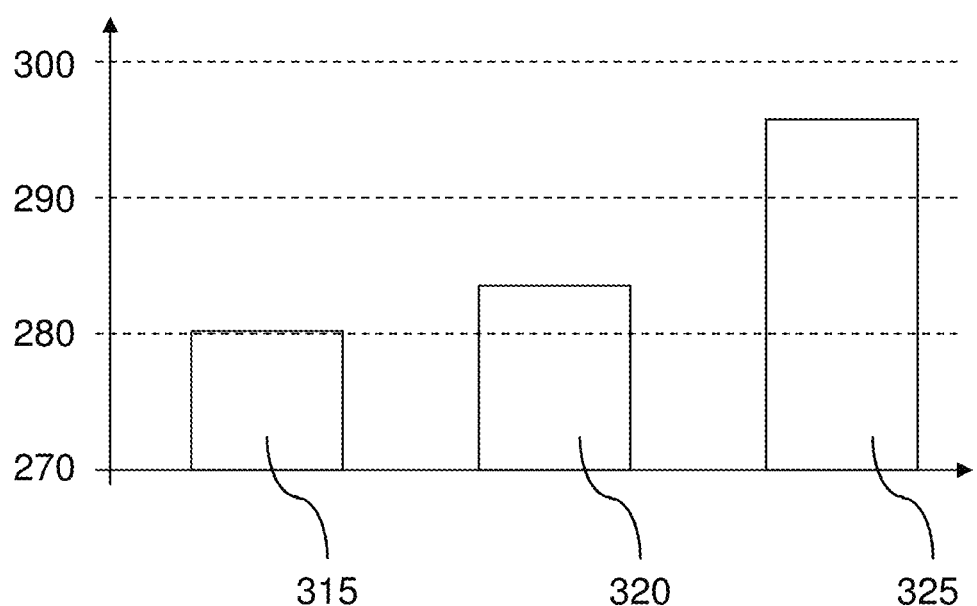

FIG. 5 shows the mean weight of the lettuces per method, from table 2. It shows the mean weight of the control lettuces 315; the mean weight of the lettuces treated with the baseline product 320; and the mean weight of the lettuces treated using crushed material that is the subject of the present invention 325.

For this trial, seven applications were carried out at ten-day intervals. The observations were recorded for the lettuces harvested.

In the trial conditions, the observations show that the mean weight of the lettuces was statistically higher for the lettuces treated using crushed material that is the subject of the present invention (295.3 g/lettuce) than for the lettuces not treated, or treated with the baseline product approved in France as root growth stimulator (280.5 and 283.10 g/lettuce, respectively) (Table 2 and FIG. 5).

Seven applications, at ten-day intervals, of the crushed material allowed the diameter and weight of the lettuces to be increased. Using crushed material that is the subject of the present invention was statistically more effective than using the baseline product.

3/Cucumbers

The finished product from the rocket (*Eruca sativa*) crushed material (here labeled "FERTI01"), applied at a rate of ten days, allowed the number of cucumbers per plant and the total harvest weight of the treated plants to be increased significantly. Using crushed material that is the subject of the present invention was statistically more effective than using the baseline product described above.

For cucumbers, the methods of applying the finished product from the crushed material comprised watering the soil utilizing a liquid formulation.

Table 3 shows the effectiveness of using crushed material that is the subject of the present invention on cucumbers, for a control plant, a plant treated with the baseline product approved in France, and a plant treated with the crushed material.

Figure 6:
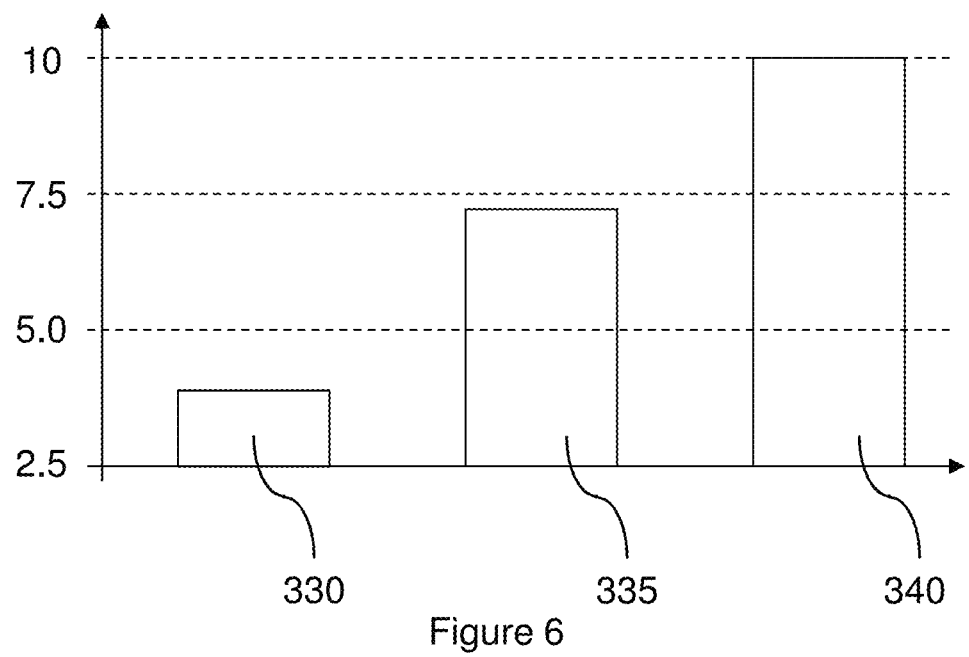

FIG. 6 shows the mean number of cucumbers per plant and per method, from table 3. It shows the mean number of cucumbers per control plant 330; the mean number of cucumbers per plant treated with the baseline product 335; and the mean number of cucumbers per plant treated using crushed material that is the subject of the present invention 340.

Figure 7:
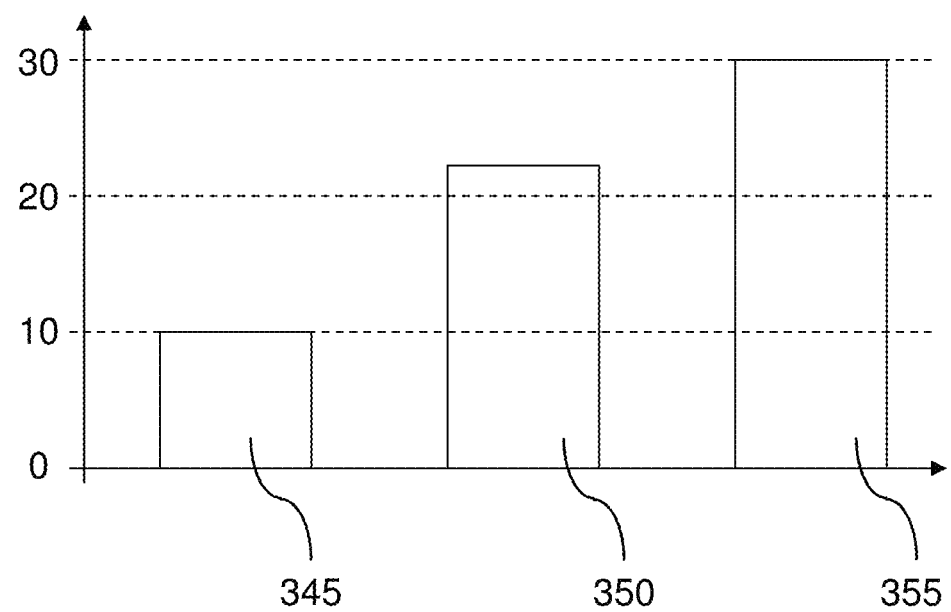

FIG. 7 shows the total weight (in kg) of cucumbers per plant and per method, from table 3. It shows the total weight of cucumbers per control plant 345; the total weight of cucumbers per plant treated with the baseline product 350; and the total weight of cucumbers per plant treated using crushed material that is the subject of the present invention 355.

For this trial, eight applications were carried out at ten-day intervals. The observations were recorded for the cucumbers harvested over a 40-day harvest period.

The results show that the mean number of cucumbers per plant during the harvest period in the plots treated using crushed material that is the subject of the present invention (10.12 cucumbers/plant) was statistically higher than from the plots not treated, or treated with the baseline product approved in France (4.10 and 7.20 cucumbers/plant, respectively) (Table 3 and FIG. 6).

The observations also show that the total harvest weight of the cucumbers harvested from the plots treated using crushed material that is the subject of the present invention (29.15 kg) was statistically higher than from the plots not treated, or treated with the baseline product (10.25 and 22.22 kg, respectively) (Table 3 and FIG. 7).

Eight applications, at ten-day intervals, of the finished product from the crushed material allowed the number of cucumbers per plant and the total harvest weight of the treated plants to be increased significantly. In addition, using crushed material that is the subject of the present invention was statistically more effective than using the baseline product.

4/Cucumbers

The finished product from the rocket (*Eruca sativa*) crushed material (here labeled "FERTI01"), applied at a rate of ten days, allowed the total harvest weight of the treated plants to be increased significantly. Using crushed material

TABLE 3

Effectiveness on cucumbers (20 plants per method)

| Crop | Reading | Dates | Control | Baseline | FERTI 01 |
|---|---|---|---|---|---|
| Cucumber *Cucumis sativus* L. (CUMSA) | Mean number of cucumbers harvested per plant | Harvests Jun. 11, 2011 to Jul. 30, 2011 | 4.10 a | 7.20 b | 10.12 c |
| | Total harvest weight (kg) | | 10.25 a | 22.22 b | 29.15 c | that is the subject of the present invention was statistically more effective than using the baseline product mentioned above.

Using crushed material that is the subject of the present invention also allowed the number of fertile flowers to be increased significantly. In addition, using crushed material that is the subject of the present invention was statistically more effective than using the baseline product mentioned above.

For cucumbers, the methods of applying the finished product from the crushed material comprised watering the soil utilizing a liquid formulation.

Table 4 shows, in the trial conditions, the effectiveness of using crushed material that is the subject of the present invention on cucumbers, for a control plant, a plant treated with the baseline product, and a plant treated using crushed material that is the subject of the present invention.

Figure 10:
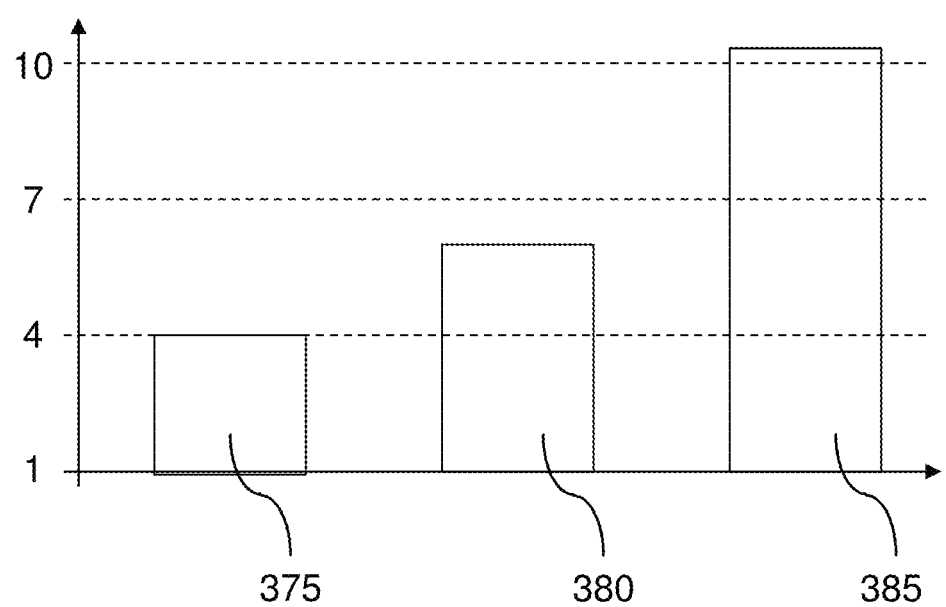

The observations also show that the total harvest weight from the plots treated using crushed material that is the subject of the present invention (10.2 kg) was statistically higher than from the plots not treated, or treated with the baseline product (3.9 and 6.1 kg, respectively) (Table 4 and FIG. 10).

Four applications, at ten-day intervals, of the finished product from the crushed material allowed the number of fertile flowers per plant and the total harvest weight of the treated cucumber plants to be increased significantly. In addition, using crushed material that is the subject of the present invention was statistically more effective than using the baseline product.

It should be noted that the results of this trial were obtained over a short harvest period (23 days).

An in vitro study of cucumbers was carried out in the laboratory to support the hypothesis that the crushed mate-

TABLE 4

Effectiveness on cucumbers (10 plants/method)

| Crop | Reading | Dates | Control | Baseline | FERTI 01 |
| --- | --- | --- | --- | --- | --- |
| Cucumber Cucumis sativus | Mean number of fertile flowers per plant | Before harvesting September 2015 to July 2010 | 12.25 a | 10.10 a | 16.12 b |
| | Mean number of cucumbers harvested per plant | At harvesting October 2008 to October 2031 | 3.5 a | 5.1 ab | 8.5 b |
| | Total harvest weight (kg) over the period | At harvesting October 2008 to October 2031 | 3.9 a | 6.1 a | 10.2 b |

Figure 8:
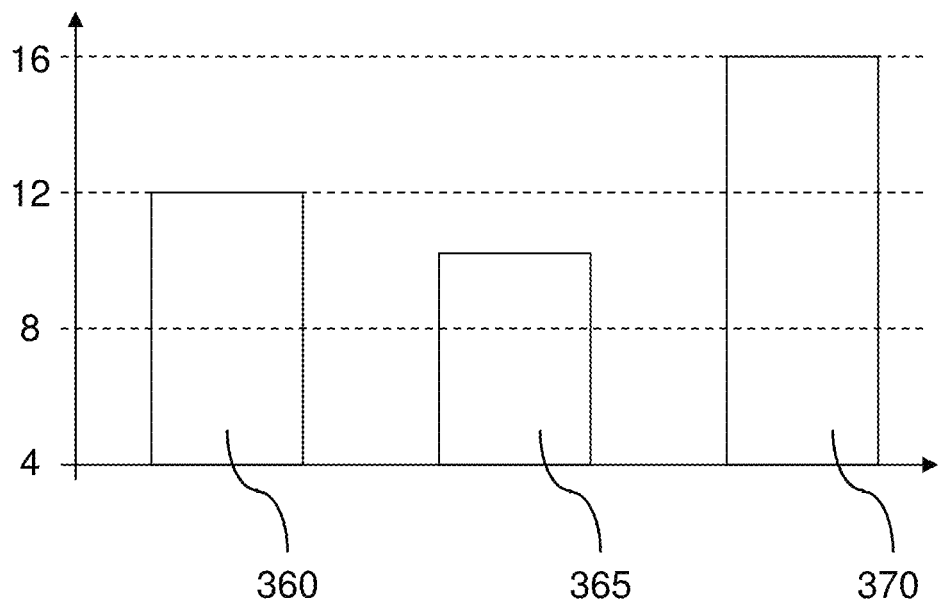

FIG. 8 shows the mean number of fertile flowers per plant and per method, from table 4. It shows the mean number of fertile flowers per control plant 360; the mean number of fertile flowers per plant treated with the baseline product 365; and the mean number of fertile flowers per plant treated using crushed material that is the subject of the present invention 370.

Figure 9:
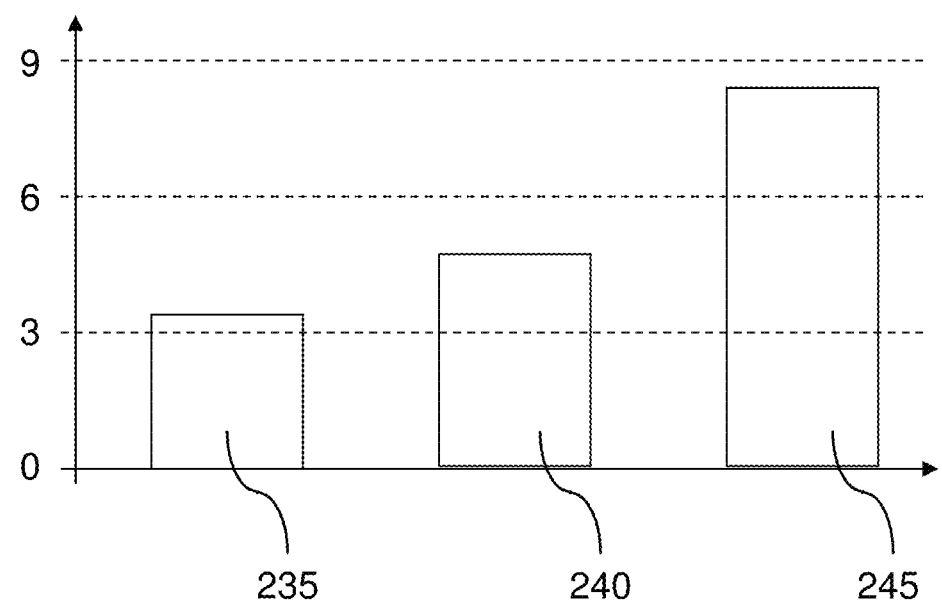

FIG. 9 shows the mean number of cucumbers harvested per plant and per method, from table 4. It shows the mean number of cucumbers harvested per control plant 235; the mean number of cucumbers harvested per plant treated with the baseline product 240; and the mean number of cucumbers harvested per plant treated using crushed material that is the subject of the present invention 245.

FIG. 10 shows the total weight of cucumbers harvested over the period per method, from table 4. It shows the total weight of cucumbers in the method of control plants 375; the total weight of cucumbers in the method of plants treated with the baseline product 380; and the total weight of cucumbers in the method of plants treated using crushed material that is the subject of the present invention 385.

For this trial, four applications of the tested products were carried out at ten-day intervals. The observations were recorded for the cucumbers harvested over a 23-day harvest period.

The results show that the mean number of fertile flowers per plant from plots treated using crushed material that is the subject of the present invention (16.12 flowers/plant) was statistically higher than from the plots not treated, or treated with the baseline product (12.25 and 10.10 flowers/plant, respectively) (Table 4 and FIG. 8).

rial might be classified in the category of root growth stimulators. In this study, use of crushed material that is the subject of the present invention was compared to use of the baseline product Osiryl (registered trademark) root growth stimulator, approved in France under marketing authorization number 1030003.

The products tested were included in the Murashige & Skoog culture medium (0.5×) at the start of the study. The cucumber seeds were sterilized with a bleach solution, then washed three times in water. The sterilized seeds were placed on the culture medium and the petri dishes were placed in an in vitro culture growth room for 15 days.

The observations were made at seven days and fourteen days after sowing. The results obtained are presented below.

Figure 11:
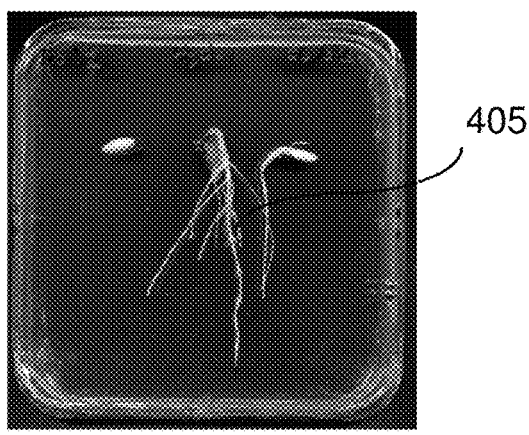
FIGS. 11 to 19 show, in the form of photographs, roots of plants treated without and with the use of the crushed material that is the subject of the present invention.
Figure 12:
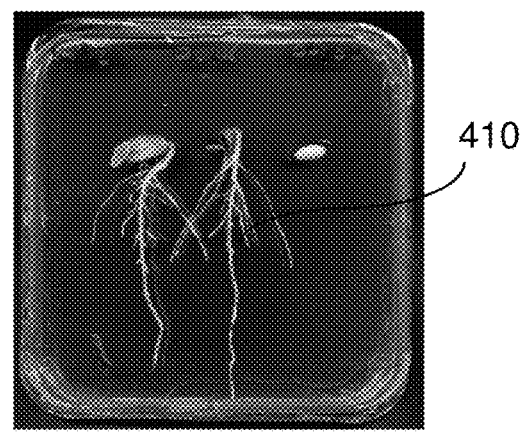
Figure 13:
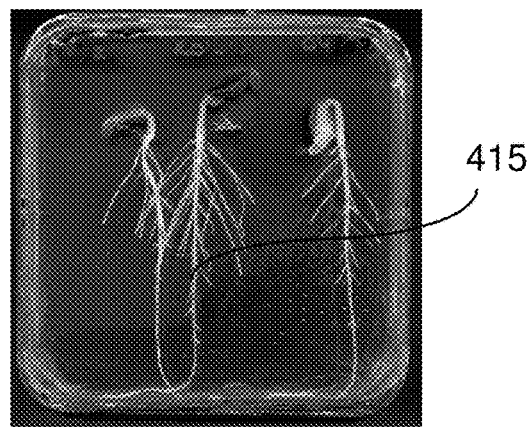

FIGS. 11, 12 and 13: photos of an observation of the products tested in an in vitro culture on cucumbers seven days after sowing. FIG. 11 shows the control 405; FIG. 12 the plant treated with the baseline product 410; and FIG. 13 the plant treated using crushed material that is the subject of the present invention 415.

Figure 14:
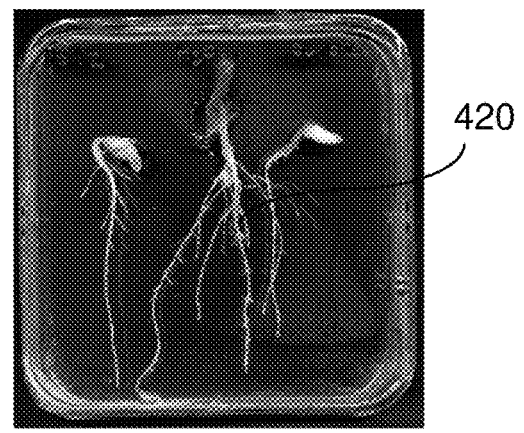
Figure 15:
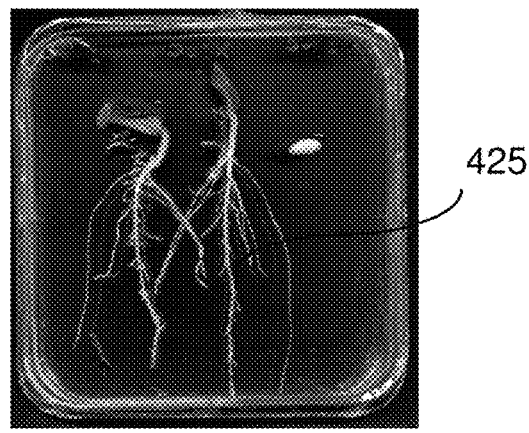
Figure 16:
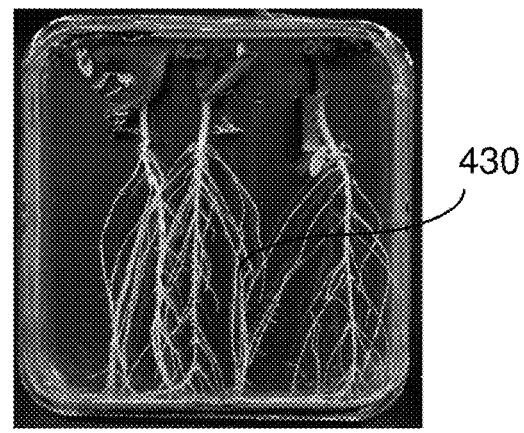

FIGS. 14, 15 and 16: photos of an observation of the products tested in an in vitro culture on cucumbers fourteen days after sowing. FIG. 14 shows the control 420; FIG. 15 the plant treated with the baseline product 425; and FIG. 16 the plant treated using crushed material that is the subject of the present invention 430.

Figure 17:
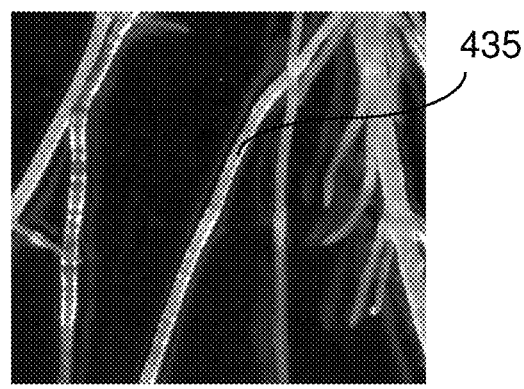
Figure 18:
Figure 19:
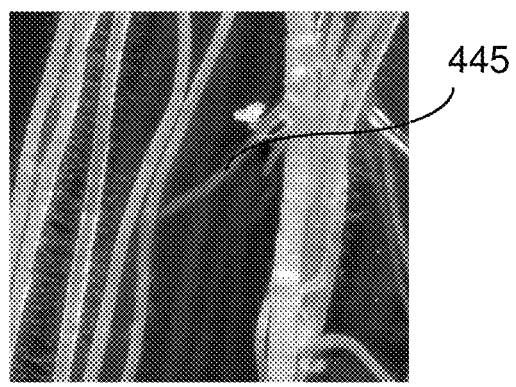

FIGS. 17, 18 and 19: photos of an observation of the products tested in an in vitro culture on cucumbers fourteen days after sowing. FIG. 17 shows the control 435; FIG. 18 the plant treated with the baseline product 440; and FIG. 19 the plant treated using crushed material that is the subject of the present invention 445.

The in vitro study on cucumbers was carried out in France, to test the finished product obtained from the crushed material compared to the baseline product Osiryl.

The observations made it possible to show that the root system was more developed when the finished product from the crushed material was included in the culture medium, compared to the control and to the baseline product. In effect, the number and size of the side roots and secondary roots were greater using crushed material that is the subject of the present invention than for the control or using the baseline product (FIGS. 11 to 16).

In addition, 14 days after sowing, root hairs were only observed in the petri dishes containing the finished product from the crushed material (FIGS. 17 to 19).

The observations of this in vitro study show that the cucumber seeds that germinated in a culture medium with the finished product from the crushed material added, showed a much more developed root system than the seeds that germinated in the "control" medium.

5/Soft winter wheat

In this preliminary experimental field trial, the finished product from the rocket (*Eruca sativa*) crushed material (here labeled "FERTI01"), applied at key physiological stages to soft winter wheat (shoot 1 cm, 2 nodes, GFT/ fragment, stamen emergence), allowed the total harvest weight of the treated plants to be increased significantly compared to the plots not treated (standard control).

Table 5 shows the effectiveness of using crushed material that is the subject of the present invention on the wheat harvest and on the protein content of the harvest, for a plot of standard control plants not treated, and a plot of plants treated with the present invention.

TABLE 5

Effectiveness on soft winter wheat

| Crop | Yield readings | Dates | Control | FERTI01 |
|---|---|---|---|---|
| Soft winter wheat | Qx/Ha | July 2010 | 74.9 a | 78.8 b |
|  | Proteins |  | 10.8 a | 11.3 b |

The General Observations were:

a/ No phytotoxicity was observed, in particular no leaf burn, which is frequently observed when triazoles are used.

b/ Slight precocity (one to two days) of stages was observed, especially for heading.

c/ The difference in the harvest weight was significantly higher (four quintals more seeds per hectare) for the method treated using crushed material that is the subject of the present invention.

d/ The level of proteins, a decisive criterion in the bread wheat market for example, was significantly higher in the harvest from plots treated using crushed material that is the subject of the present invention.

The trial conditions of this preliminary trial will be improved to optimize the effects of the use of crushed material that is the subject of the present invention.

For wheat, the methods of applying the finished product from the crushed material comprised a foliar spray utilizing a liquid formulation.

6/Maize

A trial was carried out on young maize plants in a culture room over a 52-day period (from sowing to final reading).

Below is a description of the trials concerning use of the finished product from the rocket (*Eruca sativa*) crushed material, and of the method that is the subject of the present invention.

Figure 20:
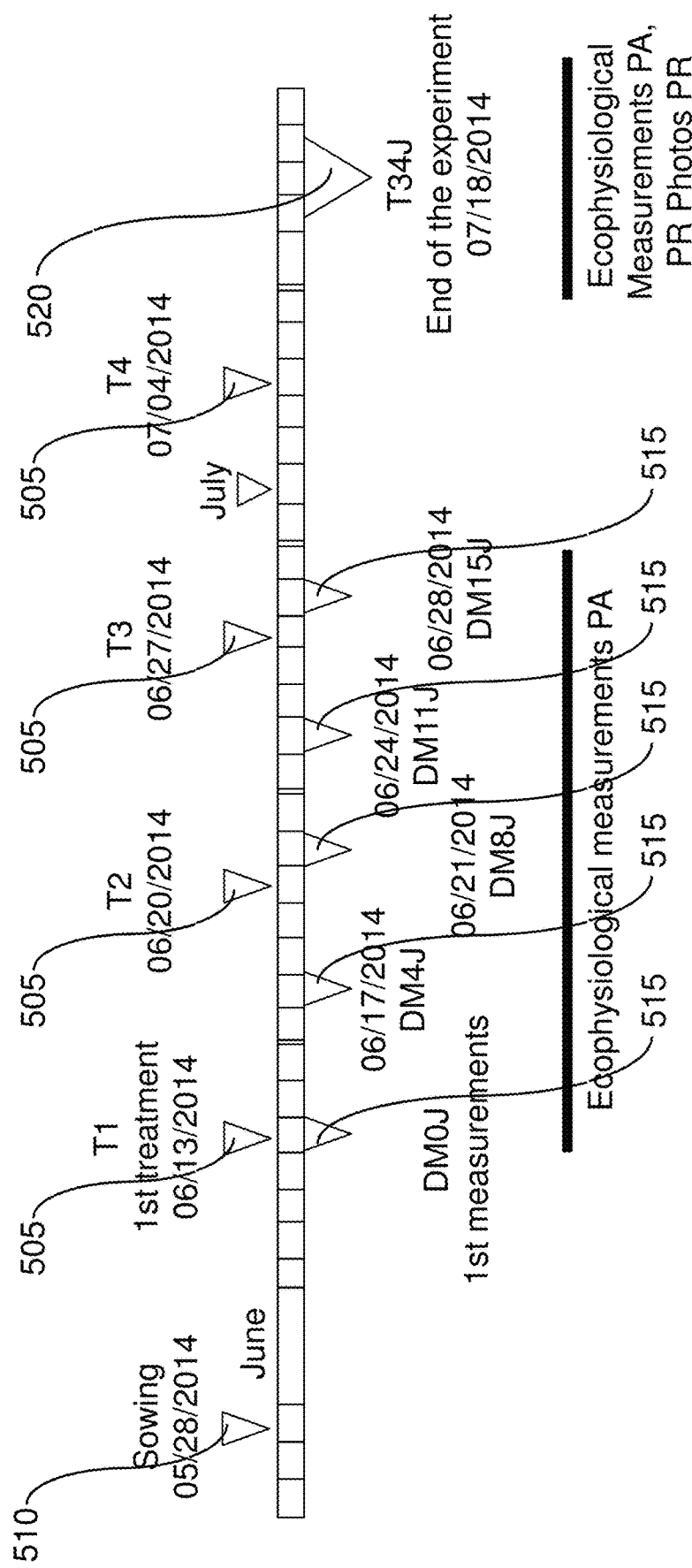
FIG. 20 represents, in the form of a time diagram, a trial procedure testing the use and the method that are the subjects of the present invention on maize.

FIG. 20 shows the trial procedure testing the crushed material on maize. Four weekly treatments (triangles 505), by spraying or watering, were applied to seedlings from the 3-leaf stage, 15 days after sowing (triangle 510). The first treatment coincided with DM0J, the date of the first ecophysiological measurements (triangles 515), June 13. The first four measurements (DM0J, DM4J, DM11J, DM15J) concerned the aboveground portion (PA). The end of the trial (DM34J, triangle 520) also allowed physiological measurements of the root portion (PR) to be taken.

The plant material and the growing conditions of the maize are given below.

The sand, with particle size 0.2-5 mm (Filtration sand from Castorama, registered trademark) was rinsed four times with distilled water, then dried for one night in a 105° C. oven. Approximately 100 g of dried sand was used to fill over 60 small containers made of polypropylene plastic (30 cl), then soaked with 40 ml of a nutritive solution prepared according to the manufacturer's protocol (GHE fertilizer). In each container, one maize seed was planted one cm below the surface to germinate. The containers were then placed in the culture chamber under controlled conditions, with a photoperiod of 16 hours, PPFD (acronym for "photosynthetic photon flux density") approximately equal to 250 $\mu mol.m-2.s-1$, humidity of 75%±5%, and a temperature of 24° C.±2° C. in the day and 20° C.±2° C. at night.

After ten days, having reached the 3-leaf stage, the young seedlings were transferred into 2-liter plastic pots filled with sand. After three days' acclimatization, the pots were evenly divided into three groups of 20 plants for the start of the treatments.

There were fifteen days between sowing and the first treatment. At the end of this period, the 60 maize plants obtained were divided into three methods: a control method (C) and two types of treatment with the biostimulant produced from the crushed material, by watering (A) and by spraying (P).

An aqueous extract supplied by the inventor at the beginning was diluted eight times. One hundred milliliters of this dilution was applied to the maize plants, added directly into the pots for method A or sprayed on the plants for method P. For method C, the pots were given 100 ml of water.

The first treatment was applied on Jun. 13, 2014. Three other treatments were scheduled on a weekly basis (FIG. 20).

During the treatments, measurements related to the plant and root growth were taken for the plants of each method, A, P and C. In total, there were four measurement dates: the day of the first treatment (DM0J), 4 (DM4J), 8 (DM8J), 11 (DM11J), 16 (DM16J) and 34 (DM34J) days later (FIG. 20). We measured all the following physiological parameters:

A/ Mean size of the plants:

The plant's size is the distance that separates the base of the coleoptile and the end of the plant's most developed leaf. A mean was calculated for the 20 plants in each method.

B/ Mean Growth Rate:

The mean growth rate was calculated beginning on DM4J. It corresponds to the difference in size between two adjacent measurement dates divided by the number of days between them. A daily mean was then calculated for each method.

C/ Mean leaf count:

The total leaf count was manually counted on DM34J.

D/ Mean diameter of the stem:

This measurement is the mean of the stem diameters for the 20 plants of each method (A, P, or C). The measurements began on DM11J, the date when the stem was thick enough for the measurement to be taken. The diameter was measured using a caliper rule.

E/ Measurement of the mean weight of the aboveground portion and of the number of leaves:

These measurements were made at the end of the trial (DM34J) on plants 44 days old. The aboveground portion was separated from the roots, then weighed with the scales. The mean weight was calculated for the 20 plants in each method. The leaf count was manually counted.

F/ Measurement of the mean weight of the root system

First, the roots were removed from the pots and rinsed with water. The fresh weight of the root portion was measured with precision scales. A mean of the 20 plants was calculated for all these parameters.

G/ The mean chlorophyll and flavonol indexes:

The chlorophyll and flavonol indexes were read automatically using a Dualex portable leaf clip (Cerovic, Masdoumier et al. 2012). The device was equipped with a portable infrared light sensor, which made it possible to take non-destructive real-time measurements of the chlorophyll and flavonols of the foliar epidermis following excitation. On DM0J, leaf no. 3, starting from the base of the coleoptile, was sufficiently developed for these measurement to be taken. To ensure a uniform reading, the clip was positioned two cm from the leaf tip. The values were expressed in Dualex units. On DM34J, following the senescence of the largest portion of these third leaves, the measurement was not taken.

All these statistical tests described were carried out using the R program (Pinheiro, Bates et al. 2011). To calculate the various statistical differences between the samples, a Tukey test was carried out for a two-by-two comparison of the means of each method. Ranking according to different letters was carried out manually.

The table shown in FIG. 21 shows the measurements for various ecophysiological parameters during treatments by the use and the method that are the subjects of the present invention.

For each of the measurement dates (DM4J, DM11J, DM34J), the results show the means of the values read for 20 individuals (n=20), following treatments of the maize plants with the finished product from the crushed material by watering (A), compared to the control plants (C). The means are given a different letter when they are statistically different, P<0.05.

The table shown in FIG. 22 shows the measurements for various ecophysiological parameters (Chlorophyll index and Flavonols index) during treatments using the finished product from the crushed material. For each of the measurement dates (DM4J, DM8J, DM15J), the results show the means of the values read for 20 plants (n=20), following treatments of the maize plants with the finished product from the crushed material by watering (A) and by spraying (P), compared to the control plants (C). The means are given a different letter when they are statistically different, P<0.05.

Figure 23A:
FIGS. 23A to 23F show, in the form of photographs, roots of plants treated with the use and the method that are the subjects of the present invention.
Figure 23D:
Figure 23B:
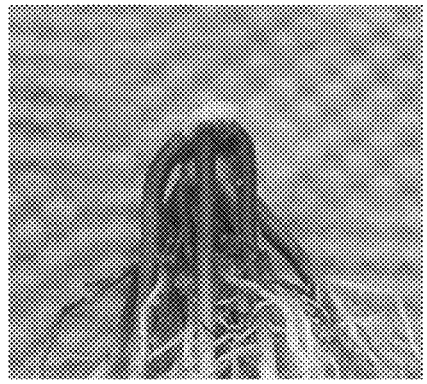
Figure 23E:
Figure 23F:
Figure 23C:
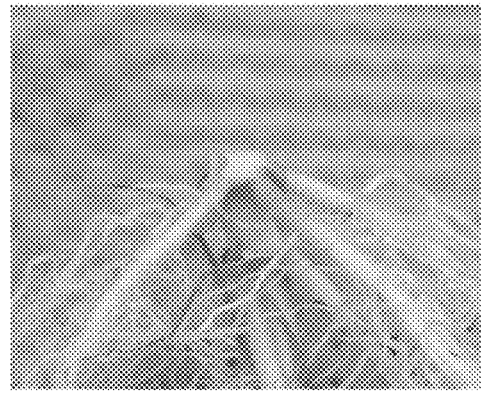

FIGS. 23A to 23F show the stimulation of the root growth under the effect of the finished product from the crushed material. The photos compare the root systems of the control method (FIGS. 23C and 23F) with the treatment by watering methods (FIGS. 23A and 23D) and the spraying methods (FIGS. 23B and 23E).

Table 6 below shows the stimulant effect of the treatment by the use and the method that are the subjects of the present invention on the mean weight of the root portion of maize plants. The results show the means for 20 plants (n=20) of the treatment by watering (A) and by spraying (P) methods compared to the control method (C). The values are given a different letter if they are statistically different, P<0.05.

TABLE 6

|  | C | A | P |
|---|---|---|---|
| Mean weight of the root system (g) | 13.6 a | 17.3 b | 15.7 b |

Monitoring the ecophysiological parameters (FIG. 21) linked to the plant growth allowed us to assess the immediate changes occurring after application of the finished product from the crushed material. Just four days after the first treatment (DM4J), we observed that application of the finished product from the crushed material by watering (A) led to a significant increase in the size of the plants. Throughout the trial, the plants of method A remained significantly larger than those of the control method (C).

The mean growth rate values for method A remained significantly higher than those of the controls, for all measurement dates.

Like the mean size, the values recorded for the mean diameter of the plants corresponding to method A are significantly higher than the values for method C.

At the end of the treatments, the aerial biomass measurements showed a significant advance for method A compared to the Control.

The chlorophyll and flavonol indexes (FIG. 22) showed a positive development throughout the trial.

Like the plant growth parameters, these two indexes recorded an increase in value for the 2 methods A and P, with a significant difference for method P, from the 4th day after treatment. Up to DM8J, ie one day after the second treatment, the chlorophyll and flavonol indexes remained in favor of the plants of method P, with a significant increase compared to the control plants. At time DM15J, the Chlorophyll index showed a significant difference for method A, compared to the values read for the control method. At the same time, the Flavonol index gave values that continued to show a significant difference for method P. In general, the two indexes showed a positive development over time for methods A and P, even if the differences were not significant for each reading.

Visual inspection of the root system (FIGS. 23A to 23F) allowed us to notice very clear changes at the level of the root phenotype between different methods. The first observation is the extended very pronounced red-purple color of the region at the base of the mesocotyl for the methods treated with the finished product from the crushed material for methods A (FIGS. 23A and 23D) and P (FIGS. 23B and 23E). The second observation concerned the root systems for methods A and P, which seemed to the eye to be more developed than those of the control plants, confirmed by weighing the root system (Table 6).

According to the results obtained, it appears very evident that the two types of treatment, watering and spraying, led to an increase in the plant growth parameters for the maize. This increase, which occurred very early after the first treatment, ie after four days, showed a significant benefit for the plants treated by the product of the invention, which was maintained throughout the trial.

An important parameter, which was undoubtedly more developed in the plants watered with the product produced from the crushed material, was the root system. As well as its anchoring role, the root system plays an important role in absorbing nutrients present in the soil. Correlations between the development of root volume, following biostimulant treatments, and a better use of the soil's micro- and macro-elements has been described in several studies (Vessey, 2003; Fan et al. 2006; Canellas et al. 2011; Khan et al. 2013). The improvements observed in the development of the plants treated with the finished product from the Rocket crushed material may therefore be an indirect consequence of the increase in root volume, which increases the effectiveness in using the resources in the soil. The very pronounced red-purple color located at the base of the root mesophyll in the plants treated using crushed material is certainly due to the presumed accumulation of phenolic compounds. The accumulation of these compounds, currently of an unknown nature, can give a preliminary idea for one physiological effect, amongst several, of the finished product from the crushed material on the plant.

The accumulation of phenolic compounds in the plant organs is often a reactive response to environmental stimuli, here making it possible to see a concrete metabolic reaction of the maize plants to the treatment by the product that is the subject of this patent.

In the experiment described below, 20-day-old maize plants were treated with different rocket crushed materials. One group of plants was treated under normal conditions, while another group of plants was subjected to water stress throughout their growth. The plants underwent two treatments by spraying with the finished products from the crushed material of three plants from the genus Rocket (*Eruca sativa, Diplotaxis erucoides* and *Bunias erucago*) at a rate of ten days. The control plants in both conditions were subjected to the same treatment with water.

The following measurements were taken: Measurements of the mean weight of the aboveground portion of maize plants under the different conditions, subjected to water stress or not, and treated with the finished products from crushed material.

In table 7, for each of the measurements (t=20 days), the results show the means of the values read for 14 individuals per method (n=14), following treatment of the maize plants with the finished products from the crushed material by watering (A) and by spraying (P), compared to the control plants (C). The means are given a different letter when they are statistically different, P<0.05.

TABLE 7

|  | C | P | A |
|---|---|---|---|
| NORMAL CONDITIONS | | | |
| Mean weight (g) of the aboveground portion of maize plants after treatment with *Eruca sativa* | 19.3 b | 23.9 a | 24.8 a |
| Mean weight (g) of the aboveground portion of maize plants after treatment with *Diplotaxis erucoides* | 17.2 b | 25.2 a | 24.6 a |
| Mean weight (g) of the aboveground portion of maize plants after treatment with *Bunias erucago* | 18.5 b | 23.5 a | 23.8 a |
| WATER STRESS | | | |
| Mean weight (g) of the aboveground portion of maize plants after treatment with *Eruca sativa* | 3.8 b | 10.6 a | 10.8 a |
| Mean weight (g) of the aboveground portion of maize plants after treatment with *Diplotaxis erucoides* | 2.5 b | 9.5 a | 8.5 a |
| Mean weight (g) of the aboveground portion of maize plants after treatment with *Bunias erucago* | 3.2 b | 10.2 a | 9.8 a |

In the trial conditions referred to as normal (optimum growing conditions), the three crushed materials produced from the three genera of Rocket (*Eruca sativa, Diplotaxis erucoides* and *Bunias erucago*) allowed the maize plants to have significantly better foliar development, regardless of the treatment, by watering the soil or by foliar spray. In the water stress conditions, as can be seen, the mean weight of the aboveground portion was very low, given the significant dehydration of the plants (many dry leaves). However, the treated plants presented a significantly better vigor and hydration rate than the control plants, regardless of the Rocket genus used.

The application of the product described above showed a positive effect on the tolerance to the lack of water and nutrients. Sprayed on the plants, the two types of application improved the plant's appearance and water content. This property may be the result of an improvement in the root biomass (Marulanda et al. 2009; Anjum et al. 2011), the release of plant hormones such as ABA or CKs into the soil (Zhang & Ervin 2004; Arkhipova et al. 2007; Cohen et al. 2008; Marulanda et al. 2009), or the degradation of ethylene (Arshad et al. 2008).

The list of trials, given as examples, is not exhaustive, and does not in any way represent a limitation to the use of the crushed material that is the subject of the present invention. This crushed material can be effective on many other plant types not described above.

Demonstration of in vitro effectiveness: use of the crushed material that is the subject of the present invention stimulates the growth of root hairs, and root growth. The observed effects on plant growth are greater than the effects observed during treatments carried out with the baseline product described above.

The present invention applies, in particular, to biostimulation of one of the following plants:

tomato;

lettuce;

cucumber;

wheat;

soft wheat;

maize; or cereal in the broad sense.

LIST OF BIBLIOGRAPHIC REFERENCES

Adesemoye, A. O. and J. W. Kloepper (2009). "Plant-microbes interactions in enhanced fertilizer-use efficiency." *Applied Microbiology and Biotechnology* 85(1): 1-12.

Anjum, S. A., et al. (2011). "Fulvic Acid Application Improves the Maize Performance under Well-watered and Drought Conditions." *Journal of Agronomy and Crop Science* 197(6): 409-417.

Arkhipova, T. N., et al. (2007). "Cytokinin producing bacteria enhance plant growth in drying soil." *Plant and Soil* 292(1-2): 305-315.

Arshad, M., et al. (2008). "Inoculation with *Pseudomonas* spp. Containing ACC-Deaminase Partially Eliminates the Effects of Drought Stress on Growth, Yield, and Ripening of Pea (*Pisum sativum* L.)." *Pedosphere* 18(5): 611-620.

Bashan, Y., et al. (2014). "Advances in plant growth-promoting bacterial inoculant technology: formulations and practical perspectives (1998-2013)." *Plant and Soil* 378(1-2): 1-33.

Berbara, R. L. L. and A. C. García (2014). Humic substances and plant defense metabolism. *Physiological Mechanisms and Adaptation Strategies in Plants Under Changing Environment*, Springer: 297-319.

Berg, G. (2009). "Plantmicrobe interactions promoting plant growth and health: perspectives for controlled use of microorganisms in agriculture." *Applied Microbiology and Biotechnology* 84(1): 11-18.

Canellas, L. P., et al. (2011). "Probing the hormonal activity of fractionated molecular humic components in tomato auxin mutants." *Annals of Applied Biology* 159(2): 202-211.

Cohen, A. C., et al. (2008). "*Azospirillum brasilense* Sp 245 produces ABA in chemically-defined culture medium and increases ABA content in *Arabidopsis* plants." *Plant growth regulation* 54(2): 97-103.

Craigie, J. S. (2011). "Seaweed extract stimuli in plant science and agriculture." *Journal of Applied Phycology* 23(3): 371-393.

Ertani, A., et al. (2009). "Biostimulant activity of two protein hydrolyzates in the growth and nitrogen metabolism of maize seedlings." *Journal of plant nutrition and soil science* 172(2): 237-244.

Fan, X., et al. (2006). "Glutamine transport and feedback regulation of nitrate reductase activity in barley roots leads to changes in cytosolic nitrate pools." *Journal of Experimental Botany* 57(6): 1333-1340.

Hayat, R., et al. (2010). "Soil beneficial bacteria and their role in plant growth promotion: a review." *Annals of Microbiology* 60(4): 579-598.

Hong, D. D., et al. (2007). "Seaweeds from Vietnam used for functional food, medicine and biofertilizer." *Journal of Applied Phycology* 19(6): 817-826.

Khan, W., et al. (2013). "*Ascophyllum nodosum* Extract and Its Organic Fractions Stimulate *Rhizobium* Root Nodulation and Growth of *Medicago sativa* (Alfalfa)." *Communications in Soil Science and Plant Analysis* 44(5): 900-908.

Khan, W., et al. (2009). "Seaweed extracts as biostimulants of plant growth and development." *Journal of Plant Growth Regulation* 28(4): 386-399.

Mancuso, S., et al. (2006). "Marine bioactive substances (IPA extract) improve foliar ion uptake and water stress tolerance in potted *Vitis vinifera* plants." *Advances in Horticultural Science* 20(2): 156-161.

Marulanda, A., et al. (2009). "Stimulation of plant growth and drought tolerance by native microorganisms (AM fungi and bacteria) from dry environments: mechanisms related to bacterial effectiveness." *Journal of Plant Growth Regulation* 28(2): 115-124.

Mattner, S. W., et al. (2013). "The effect of kelp extract on seedling establishment of broccoli on contrasting soil types in southern Victoria, Australia." *Biological Agriculture & Horticulture* 29(4): 258-270.

Milton, R. F. (1952). "Improvements in or relating to horticultural and agricultural fertilizers." *British Patent* 664989.

Milton, R. F. (1964). *Liquid seaweed as a fertilizer*. Proc Int Seaweed Symp.

Norrie, J. and J. P. Keathley (2005). *Benefits of ascophyllum nodosum marine-plant extract applications to Thompson Seedless grape production*. X International Symposium on Plant Bioregulators in Fruit Production 727.

Rayorath, P., et al. (2008). "Rapid bioassays to evaluate the plant growth promoting activity of *Ascophyllum nodosum* (L.) Le Jol. using a model plant, *Arabidopsis thaliana* (L.) Heynh." *Journal of Applied Phycology* 20(4): 423-429.

Rioux, L. E., et al. (2007). "Characterization of polysaccharides extracted from brown seaweeds." *Carbohydrate polymers* 69(3): 530-537.

Sharma, S. H. S., et al. (2012). "Biostimulant activity of brown seaweed species from Strangford Lough: compositional analyses of polysaccharides and bioassay of extracts using mung bean (*Vigno mungo* L.) and pak Choi (*Brassica rapa chinensis* L.)." *Journal of Applied Phycology* 24(5): 1081-1091.

Varanini, Z. and R. Pinton (2000). "Direct versus indirect effects of soil humic substances on plant growth and nutrition." *The Rhizosphere. Biochemistry and organic substances at the soil-plant interface*.(eds. R Pinton: 141-157.

Vessey, J. K. (2003). "Plant growth promoting rhizobacteria as biofertilizers." *Plant and Soil* 255(2): 571-586.

Zhang, X. and E. H. Ervin (2004). "Cytokinin-containing seaweed and humic acid extracts associated with creeping bentgrass leaf cytokinins and drought resistance." *Crop science* 44(5): 1737-1745.

The invention claimed is:

1. A method for promoting plant growth, the method comprising: the application on said plant of an extract obtained by liquid extraction, aqueous extraction, solvent extraction, or oil extraction from at least one part of a Rocket plant, thereby promoting plant growth, wherein the application on the plant is achieved by foliar spray.

2. A method for speeding up the growth of a plant, that comprises: the application on said plant of a composition obtained from an extract obtained by liquid extraction, aqueous extraction, solvent extraction, or oil extraction from at least one part of a Rocket plant, thereby speeding up the growth of a plant, wherein the application on the plant is achieved by foliar spray.

3. The method according to claim 2, wherein said Rocket plant is from the genus *Eruca*, Diplotaxis, Bunias, Erucastrum or Cakile.

4. The method according to claim 2, wherein the application on the plant is achieved by foliar spray, watering the soil, drop-by-drop irrigation, use in hydroponics.

5. The method according to claim 2, which comprises a step of grinding at least one part of plants from the genus

*Eruca*, Diplotaxis, Bunias, Erucastrum or Cakile to provide the extract, and a step of filtering solid portions of said extract to obtain a liquid.

6. The method according to claim 2, wherein said plant which growth is speeded up is a tree.

7. The method according to claim 2, wherein at least one active ingredient is obtained by liquid extraction.

8. The method according to claim 2, wherein the extract is obtained from the leaves of plants from the genus *Eruca*, Diplotaxis, Bunias, Erucastrum or Cakile.

9. The method according to claim 2, wherein the extract is obtained from the seeds of plants from the genus *Eruca*, Diplotaxis, Bunias, Erucastrum or Cakile.

10. The method according to claim 2, wherein the extract is obtained from the flowers of plants from the genus *Eruca*, Diplotaxis, Bunias, Erucastrum or Cakile.

11. The method according to claim 2, wherein the extract is obtained from plants from the genus *Eruca*.

12. The method according to claim 2, wherein the extract is obtained from plants from the genus Diplotaxis.

13. The method according to claim 2, wherein the extract is obtained from plants from the genus Bunias.

14. The method according to claim 2, wherein the extract is obtained from plants from the genus Erucastrum.

15. The method according to claim 2, wherein the extract is obtained from plants from the genus Cakile.

16. The method according to claim 2, wherein at least one active ingredient is obtained by aqueous extraction.

17. The method according to claim 2, wherein at least one active ingredient is obtained by extraction of press cakes or pastes.

18. The method according to claim 2, wherein a composition obtained from the extract from at least one part of Rocket plants is formulated in the form of powder, granules, dispersible granules or slow-diffusion granules.

19. The method according to claim 2, wherein a composition obtained from the extract from at least one part of Rocket plants is formulated in liquid form.

20. The method according to claim 2, wherein the application includes a dose which is between 0.01-12 g/L of said extract.

21. The method according to claim 3, wherein said Rocket plant is from a species selected from *Eruca sativa, Eruca vesicaria*, Diplotaxis erucoides, Diplotaxis *tenuifolia, Diplotaxis muralis*, Bunias erucago, Bunias *orientalis*, Erucastrum nasturtiifolium, and Erucastrum *incanum*.

22. A method for speeding up the growth of a plant, that comprises: the application on said plant of a composition obtained from an extract obtained by liquid extraction, aqueous extraction, solvent extraction, or oil extraction from at least one part of a Rocket plant, wherein the application includes a dose which is less than 12 g/L of said extract.

23. A method for speeding up the growth of a plant, that comprises: the application on said plant of a composition obtained from an extract obtained by liquid extraction, aqueous extraction, solvent extraction, or oil extraction from at least one part of a Rocket plant, wherein said plant on which the composition is applied is a lettuce, a vegetable, an ornamental plant, a tree or a shrub.

\* \* \* \* \*